United States Patent [19]

Watanabe et al.

[11] Patent Number: 5,293,040
[45] Date of Patent: Mar. 8, 1994

[54] METHOD AND APPARATUS FOR MEASURING VIBRATIONS OF ROTATING SHAFT

[75] Inventors: Yukio Watanabe; Fukumi Shimizu; Katsuhiko Naruse, all of Yokohama, Japan

[73] Assignee: Kabushiki Kaisha Toshiba, Kawasaki, Japan

[21] Appl. No.: 889,902

[22] Filed: May 29, 1992

[30] Foreign Application Priority Data

May 30, 1991 [JP] Japan .................................. 3-127526

[51] Int. Cl.⁵ .............................................. G01D 5/34
[52] U.S. Cl. ..................................... 250/231.1; 73/655
[58] Field of Search ............ 250/231.1, 231.13, 231.14; 73/655, 657

[56] References Cited

U.S. PATENT DOCUMENTS

| | | | |
|---|---|---|---|
| 4,060,329 | 11/1977 | Ellis | 73/655 |
| 4,080,823 | 3/1978 | Stargardter | 73/655 |
| 4,086,808 | 5/1978 | Camac et al. | 73/655 |
| 4,751,382 | 6/1988 | Reifel et al. | 250/231.1 |

OTHER PUBLICATIONS

Nishi et al., "Complementary 2 dimensional laser Doppler velocimeter with an optical fiber probe," SPIE vol. 1267 *Fiber Optic Sensors* IV, 1990, pp. 257–263.

*Primary Examiner*—David C. Nelms
*Attorney, Agent, or Firm*—Foley & Lardner

[57] ABSTRACT

The vibration measuring apparatus of a rotating shaft is made up of a pair of projection groups provided radial directions of the shaft with spacings therebetween and having the same height, a source of measuring light for irradiating the projection groups, a light receiving element for receiving the measuring light reflected by the projection groups, and a calculating device for calculating a peripheral speed difference between the two projection groups spaced in the axial direction of the rotating shaft.

10 Claims, 4 Drawing Sheets

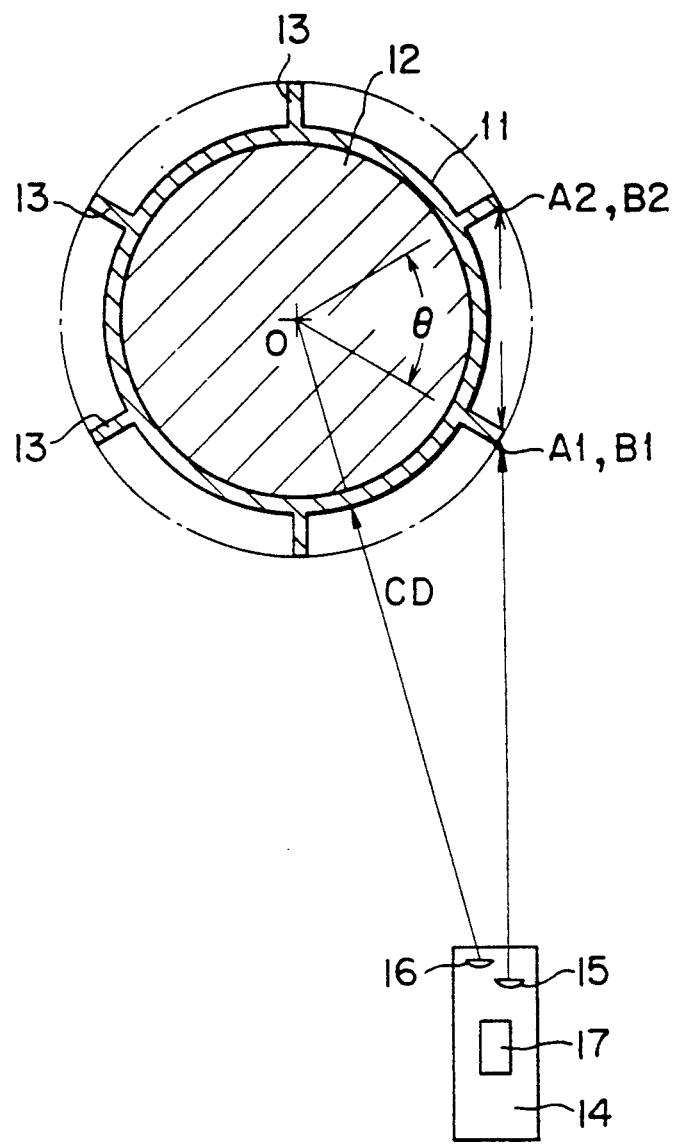
F I G. 1

METHOD AND APPARATUS FOR MEASURING VIBRATIONS OF ROTATING SHAFT

BACKGROUND OF THE INVENTION

This invention relates to a method and apparatus for measuring vibrations of a rotary shaft.

In a rotating machine such as a pump or the like, for supervising the performance of the rotating shaft, a method of measuring the vibration of the shaft has been used.

For measuring the vibration of the shaft from a remote position and in a noncontact condition, a laser Doppler vibration meter utilizing the light Doppler effect has been used. As shown in FIG. 5, this laser Doppler vibration meter comprises a laser beam generator 1 and the laser beam generated thereby is passed through an optical modulator 2 for dividing the beam into two laser beams $B_1$ and $B_2$, one laser beam $B_1$ being used as an output beam 3 directed to an object 4 to be measured, whereas the other beam $B_2$ being used as a reference beam.

A beam, reflected by the body 4 which is to be measured, undergoes a Doppler shift corresponding to the vibration speed of the object to be measured and is input to a fiber coupler 7 via a light receiving optical system 6.

The reference beam 9 interferes with the reflected beam 5 in the fiber coupler 7 and an optical fiber, not shown. The output of the fiber coupler 7 is converted into an electric signal by a light receiving element 8. This electric signal is converted into an output representing the vibration speed of the object 4 to be measured by a converter, not shown. By integrating the output of the vibrating speed, the vibration displacement of the object 4 to be measured can be outputted.

By using the prior art Doppler vibration meter described above, the vibration displacement of one point on the rotating shaft can be measured from a remote position in a noncontact condition. However, during this measurement, when the rotating shaft inclines, the measured vibration displacement would contain an inclining error, thus making inaccurate the result of measurement.

Moreover, it is impossible to measure the twisting angle vibration of the shaft and the inclination angle vibration of the shaft. To measure these various vibrations, independent vibration meters must be used. As a consequence, vibration measuring operations become complicated, and the adjustments of various measuring apparatus become difficult.

SUMMARY OF THE INVENTION

It is an object of this invention to provide a novel method and apparatus capable of measuring by a remote operation and in a noncontact condition, a shaft displacement vibration, a rotational speed vibration and shaft vibration inclination angle, and shaft twisting angle vibration by using a single vibration measuring apparatus.

Another object of this invention is to provide a novel method and apparatus capable of detecting crack faults of a rotating shaft at an early stage.

According to one aspect of this invention there is provided apparatus for measuring a vibration of a rotating shaft comprising a pair of circumferentially spaced projection groups, the pair of the projection groups having the same height and are axially displaced along the axis of a rotating shaft, the projection groups being disposed in the axial direction of the rotating shaft and axially spaced from each other, and shaft vibration detecting means including means for irradiating the projections with measuring light, means for receiving the light reflected by the projection groups, and means for calculating a peripheral speed difference between two axially spaced projections in accordance with a signal generated by the light measuring device.

According to another aspect of this invention there is provided a method of measuring a shaft vibration comprising the steps of irradiating with light two axially spaced projections formed on a rotating shaft, calculating a peripheral speed difference of the two projections in accordance with light signals respectively generated by light receiving elements receiving light reflected by the respective projections, and dividing a value obtained by integrating the calculated peripheral speed difference with a distance between the two projections, thereby calculating a twisting angle vibration of the rotary shaft.

According to still another aspect of this invention there is provided a method of measuring a shaft vibration comprising the steps of projecting light upon two sets of projection groups which are projected in the radial directions of a rotating shaft and spaced apart in an axial direction of the shaft, receiving light reflected by the respective projection groups by light receiving elements, setting a trigger level for respective light receiving signals produced by the light receiving elements for detecting changing time of the projections irradiated with light, and calculating a peripheral speed vibration of the rotating shaft after eliminating a light receiving signal generating at the time of changing the projections.

BRIEF DESCRIPTION OF THE DRAWINGS

In the accompanying drawings:

FIG. 1 is a schematic diagram, partly in section, showing one example of the vibration measuring apparatus according to this invention;

DESCRIPTION OF THE PREFERRED EMBODIMENT

Figure 2:
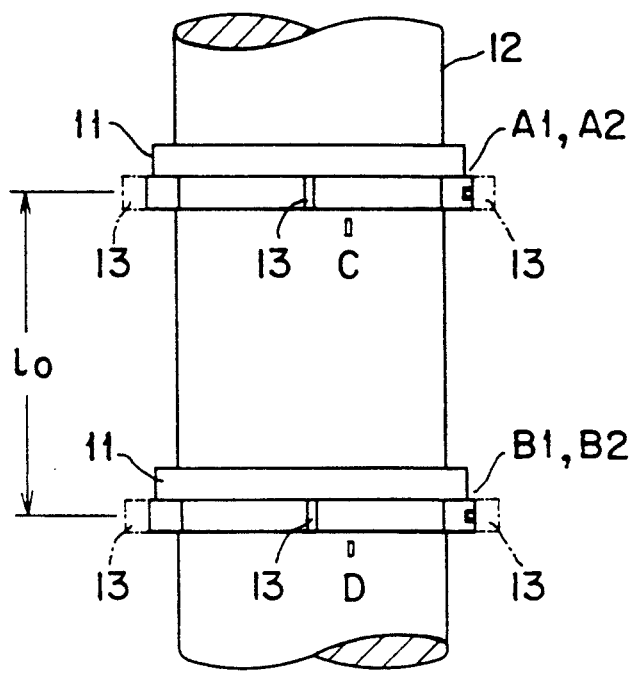
FIG. 2 is a front view showing measuring rings utilized in the method of measuring of this invention and measuring points.

As shown in FIGS. 1 and 2, on a rotating shaft 12 which is to be measured there are fitted measuring rings 11, each provided with 6 vanes 13 projecting in the radial direction and being spaced at an equal spacing in the circumferential direction. All vanes 13 of the measuring rings have the same height, this height being determined by the following condition for continuously measuring the peripheral speed, $$h > \frac{d}{2}\left(1 - \cos\frac{\theta}{2}\right)\sec\frac{\theta}{2}$$

where
 d: outer diameter of the measuring ring
 θ: angle between adjacent vanes.

By determining the height h of each vane 13 so as to satisfy the relation described above, the laser beam used for measuring is prevented from impinging upon the outer peripheral surface of the measuring ring 11, and only the laser beam reflected by the vanes 13 can be received.

The width dimension of the vane 13 (the dimension in the axial direction of the rotating shaft) may be about 1 to several mm. Furthermore, the number of vanes 13 can be increased beyond 6.

As will be described hereinafter, the peripheral speed V measured by utilizing the laser beam reflected from the vanes 13 must be corrected its angle by an equation $$Vh = V\sec\frac{\theta}{2}$$

where
Vh: actual peripheral speed
by taking into consideration the effect of the angle θ between vanes 13. In this case, as the number of vanes 13 is increased, for example to 20 (θ = 18°), the correction value becomes small so that the measurement can be made with an error range of less than 1%.

Figure 5:
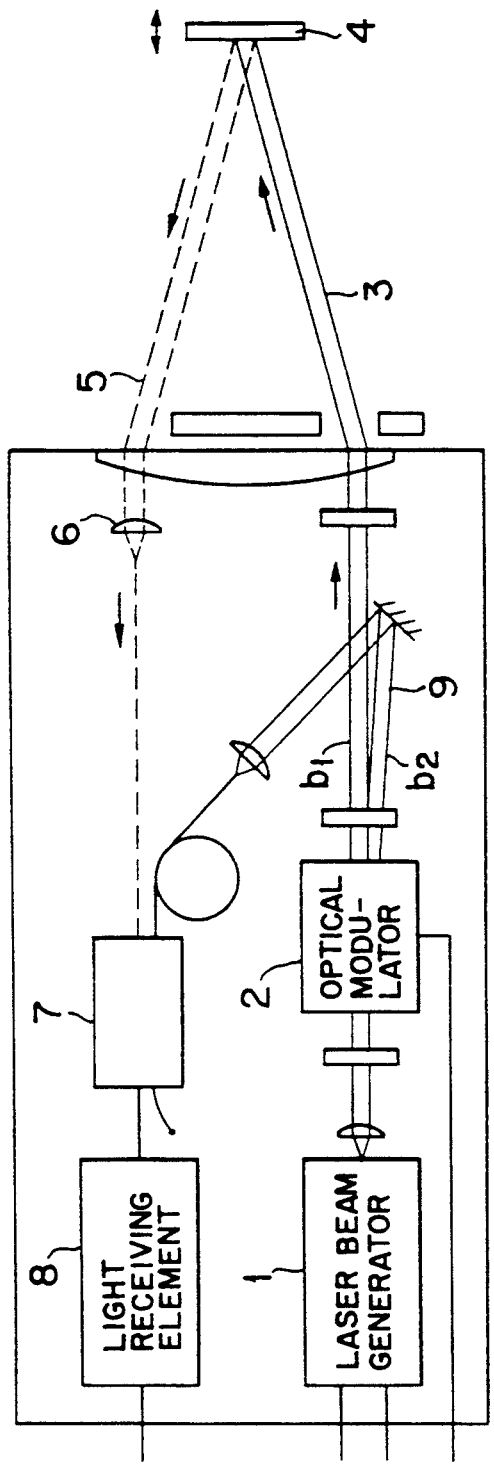
FIG. 5 is a diagrammatic representation showing the outline of a prior art laser Doppler vibration meter.

As shown in FIG. 1, at a position confronting the measuring ring 11 there is a shaft vibration detecting means 14 which contains a laser beam generator as shown in FIG. 5, two light receiving elements 15 and 16 adapted to receive the reflected beam of the laser beam, and means 17 for calculating the vibration of the rotating shaft in accordance with signals from the light receiving elements 15 and 16. One of the two light receiving elements comprises the peripheral speed difference light receiving element 15 for determining the peripheral speed difference and the other light receiving element comprises the shaft displacement light receiving element 16 which determines the shaft displacement.

As shown in FIG. 2, a pair of measuring rings 11 are provided at positions displaced by a distance $l_0$ in the axial direction. The positions of the vanes 13 acting as targets illuminated by the laser beam are denoted by $A_1$, $A_2$ and $B_1$, $B_2$.

Further, two target positions on the surface of the rotating shaft 12, which is illuminated by the laser beam are denoted by point C and point D. These points are displaced by a distance $l_0$ in the axial direction of the rotating shaft 12 in the same manner as the measuring rings 11.

The method of measuring the vibration of a rotating shaft by using the vibration measuring device having the construction described above will now be described.

(1) Measurement of the Shaft Displacement Vibration

The laser beam generated by the laser beam generator is projected upon point C or D on the surface of the rotating shaft 12 and the beam reflected from the surface is received by the shaft displacement light receiving element 16 and the shaft moving speed is determined by calculating the amount of the Doppler shift of the frequency of the reflected beam, and when the shaft moving speed is integrated, the shaft displacement vibration can be calculated.

(2) Measurement of the Shaft Vibration Inclination Angle

Figure 3:
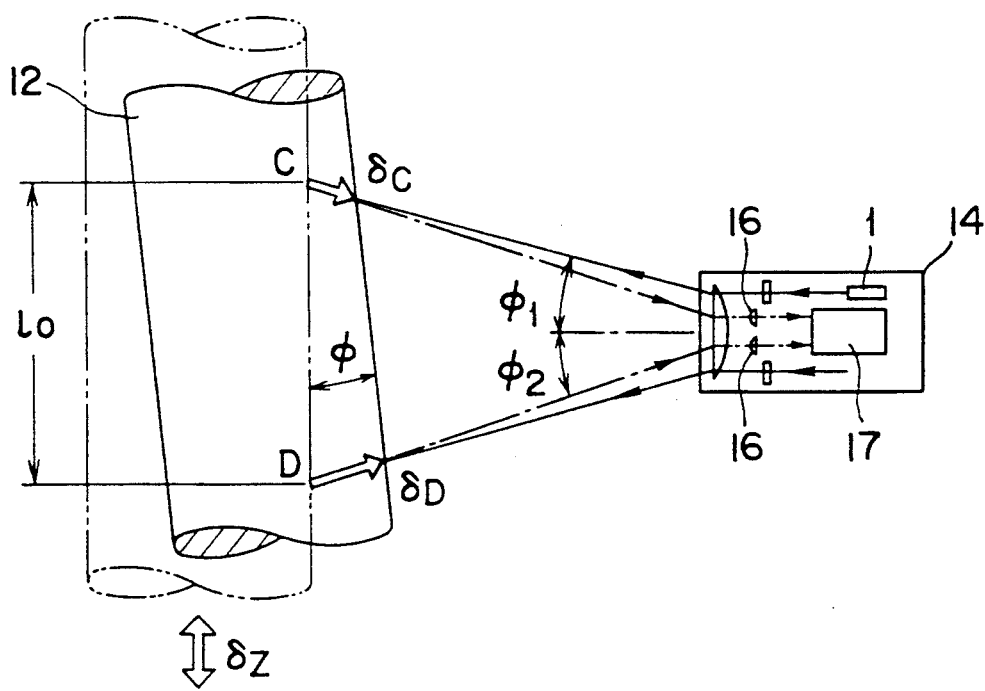
FIG. 3 is a diagrammatic representation showing the method of measurement for measuring a shaft vibration inclination angle according to this invention.

As shown in FIG. 3, the laser beam is projected upon two points C and D on the surface of the rotating shaft 12. The beam reflected from point C is used as a reference beam and received by the shaft displacement light receiving element 16, whereas the beam reflected from point D is utilized as a measuring beam and received by the shaft displacement light receiving element 16. By using the received light signals the shaft movement speeds at points C and D are calculated and the calculated speeds are integrated for determining the shaft displacement vibrations $\delta_C$ and $\delta_D$ at points C and D.

The shaft vibration inclination angle can be obtained from the following equation $$\phi = (\delta_D - \delta_C)/l_0$$

where
 $l_0$: axial distance between points C and D

At the time of this measurement, for improving the measurement accuracy, it is advantageous to locate the shaft vibration detecting means 14 at a point intermediate of points C and D and to make equal as far as possible the laser beam irradiation angle $\phi_1$ and the laser beam reflection angle $\phi_2$. To make small the effect of the axial displacement $\phi_Z$ of the rotating shaft 12 it is preferable to make small angles $\phi_1$ and $\phi_2$.

(3) Measurement of the Rotational Speed

The laser beam is projected upon the vanes 13, and the laser beam reflected thereby is received by the peripheral speed difference light receiving element 15, and the received light signal is calculated to determine the peripheral speed $V_0$ at point A. Concurrently therewith, the laser beam is projected upon point C on the rotating shaft 12 and the laser beam reflected from point C is received by the shaft displacement light receiving element 16 and the received light signal is calculated to determine the center displacement speed $V_y$ of the rotating shaft 12. The rotating speed $V_\beta$ of the rotating shaft 12 can be calculated by the following equation $$V_{62} = V_n - V_y$$

(4) Measurement of the Shaft Twisting Angle Vibration

The laser beam is projected upon the vanes 13 at points A and B. The beam reflected from point A is used as a reference beam whereas the laser beam reflected from point B is used as a measuring beam and projected upon the shaft displacement light receiving element 16. This received light signal is calculated by calculating means 17 to obtain the peripheral speeds $Vh_A$ and $Vh_B$ at points A and B.

The difference $Vh_B - Vh_A$ of the peripheral speeds is integrated and then divided by the distance $l_0$ between points A and B. In this manner the twisting angle vibration of the rotating shaft 12 can be obtained.

However, the peripheral speed difference $Vh_B - Vh_A$ thus obtained contains an influence of the shaft vibration inclination angle φ (see FIG. 3) so that in order to obtain the twisting angle vibration at a high accuracy, it is necessary to correct the peripheral speed difference by using the difference ($\delta_D - \delta_C$) between the shaft displacement vibrations at points C and D, the difference being calculated at the time of determining the shaft vibration inclination angle.

More particularly ($\delta_D - \delta_D$) is subtracted from the integrated value of ($Vh_B - Vh_A$) and the difference thus obtained is divided by the distance $l_0$ between points A and B, whereby to obtain an accurate shaft twisting angle vibration.

In the embodiment described above, it is possible to obtain the shaft twisting angle speed vibration without any integration operation. By measuring this shaft twisting angle speed vibration, crack faults of the rotating shaft can be detected at an early stage.

In the embodiment described above, an example wherein a plurality of vanes 13 were arranged at an equal spacing. However, it is possible to dispose the vanes 13 at different spacings and by detecting the changing time of the vanes irradiated with the laser beam, the twisting angle vibration of the rotating shaft 12 can be calculated.

Figure 4:
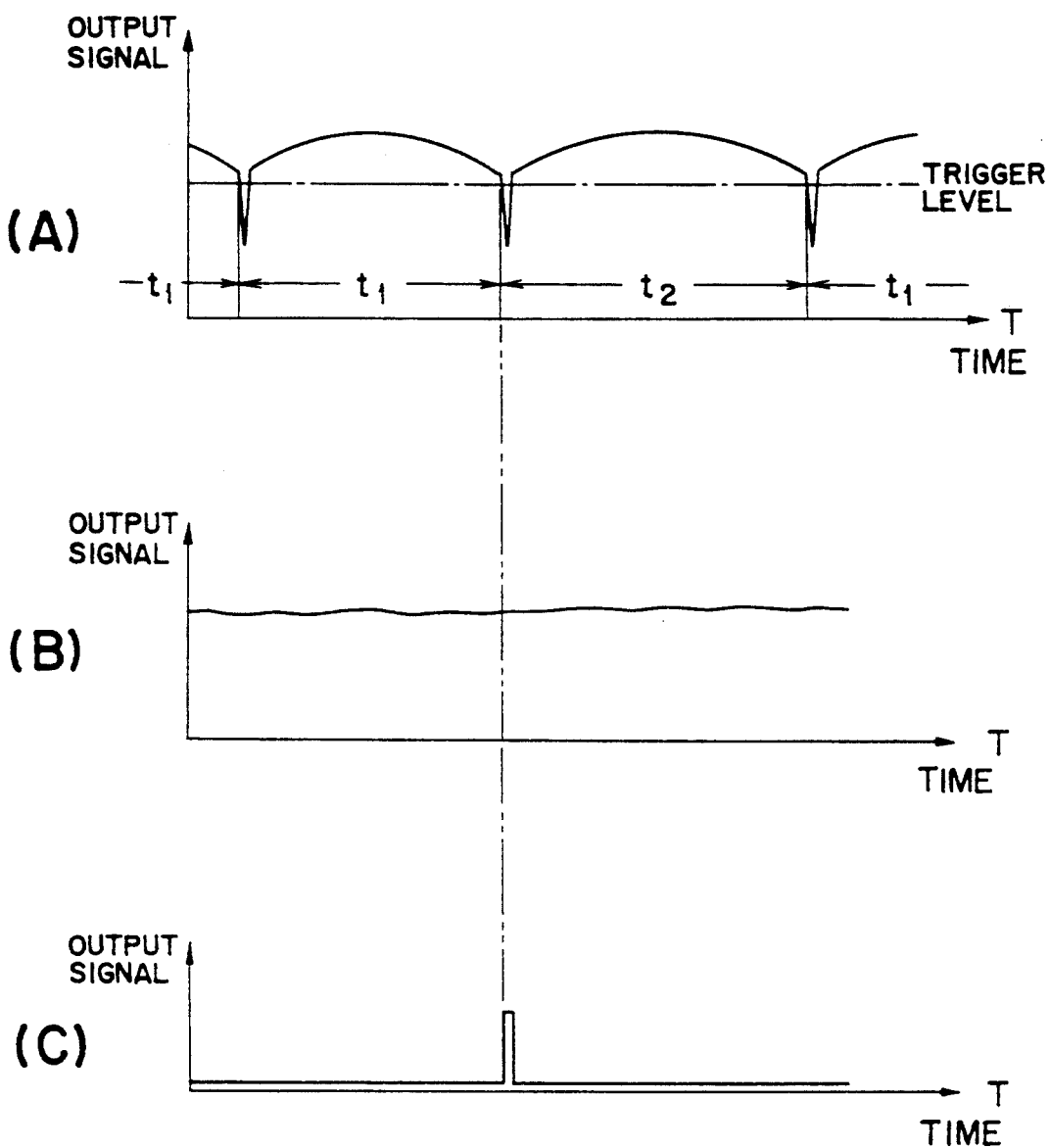
FIGS. 4(a)–4(c) depict graphs showing one example of processing a received light signal utilized in the method of measuring of this invention, wherein the graph of FIG. 4(A) shows a detected received light signal, FIG. (B) shows an output signal obtained by processing the received light signal, and FIG. (C) shows a rotational pulse signal.

When a signal generated at the time of changing the vanes is eliminated, a graph shown in FIG. 4(B) can be obtained. After such signal processing, by the same method as above described the peripheral speed of the shaft can be calculated.

Where time differences $t_1$ and $t_2$ are compared with each other so as to determine only a position at which the time interval changes from a small value to a large value, a pulse signal shown in FIG. 4(C) can be obtained. This pulse enables one to operate a rotation pulse meter and evaluate the vibration vector.

As above described, according to this invention by using only one shaft vibration measuring apparatus it is possible to measure the shaft displacement vibration, rotational speed vibration, shaft vibration inclination angle and shaft twisting angle vibration using a remote control in a noncontact condition, thereby determining the shaft twisting inherent vibration, change of the number of vibrations and the variation of the vibration. Moreover it is possible to detect crack faults of the shaft at an early stage.

What is claimed is:

1. An apparatus for measuring a vibration of a rotating shaft, comprising:
    a rotating shaft;
    a first group of projections, said projections of said first group being spaced along the circumference of said rotating shaft;
    a second group of projections, said projections of said second group being spaced along the circumference of said rotating shaft, the first and second groups of projections being spaced from each other along an axis of said rotating shaft and the projections of the first and second groups have a same height; and
    shaft vibration detecting means for detecting shaft vibration including means for irradiating said first and second groups of projections with measuring light, reflected light receiving and generating means for receiving measuring light reflected by said first and second groups of projections and for generating signals indicative of the reflected measuring light, and means for calculating a peripheral speed difference between two axially spaced projections based on said signals.

2. The apparatus according to claim 1 wherein said projections of said first and second groups are equally spaced along the circumference of said rotating shaft.

3. The apparatus according to claim 1 wherein said projections of said first and second groups are unequally spaced along the circumference.

4. The apparatus according to claim 1 wherein said irradiating means includes means for irradiating a laser beam.

5. The apparatus according to claim 1 wherein said reflected light receiving and generating means includes a peripheral speed difference light receiving element which receives the reflected light from at least one of the first and second groups of projections.

6. The apparatus according to claim 1 wherein said reflected light receiving and generating means comprises a shaft displacement light receiving element which receives reflected light from a surface of said rotating shaft.

7. The apparatus according to claim 1 wherein said reflected light receiving and generating means comprises a peripheral speed difference light receiving element and a shaft displacement light receiving element.

8. A method of measuring a shaft vibration comprising the steps of:
    projecting light upon two axially spaced points on a rotating shaft;
    receiving light reflected by each of said two points with corresponding ones of light receiving elements;
    utilizing said corresponding ones of light receiving elements for respectively generating first and second signals which are respectively indicative of the reflected light received by said corresponding ones of light receiving elements;
    calculating a speed difference of said two points based on said first and second signals; and
    calculating an inclination angle vibration of said rotating shaft by dividing a value obtained by integrating said calculated speed difference.

9. A method of measuring a shaft vibration comprising the steps of:
    irradiating with light two axially spaced projections formed on a rotating shaft;
    receiving light reflected from said axially spaced projections on first corresponding ones of light receiving elements;
    utilizing said first corresponding ones of light receiving elements for respectively generating first and second signals which are respectively indicative of the reflected light received by said corresponding ones of light receiving elements;
    calculating a peripheral speed difference of said two projections in accordance with said first and second signals; and
    calculating a peripheral speed difference of said two projections in accordance with said first and second signals; and
    dividing a value obtained by integrating said calculated peripheral speed difference with a distance between said two projections, thereby calculating a twisting angle vibration of said rotating shaft.

10. A method according to claim 9, further comprising:
    projecting light upon two axially spaced points on a rotating shaft;

receiving light reflected by each of said two points with corresponding ones of light receiving elements;

utilizing said second corresponding ones of light receiving elements for respectively generating third and fourth signals which are respectively indicative of the reflected light received by said second corresponding ones of light receiving elements;

calculating a speed difference of said two points based on said first and second signals;

subtracting said speed difference from said peripheral speed difference to produce a resulting speed difference;

integrating said resulting speed difference to obtain an integrating value; and dividing said integrated value by a distance between said two projections thereby calculating a twisting angle vibration.

* * * * *